United States Patent
Vasudevan et al.

(10) Patent No.: US 10,656,953 B1
(45) Date of Patent: May 19, 2020

(54) TECHNIQUES FOR PERSISTING AND MODIFYING CONFIGURATION REQUIREMENT STATE INFORMATION IN A MULTIPLE NODE SYSTEM

(71) Applicant: EMC IP Holding Company LLC, Hopkinton, MA (US)

(72) Inventors: Mahadevan Vasudevan, Westborough, MA (US); Kevin Barrett, Shrewsbury, MA (US); Ben Hulbert, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 150 days.

(21) Appl. No.: 15/797,220

(22) Filed: Oct. 30, 2017

(51) Int. Cl.
*G06F 9/4401* (2018.01)
*G06F 8/65* (2018.01)
*G06F 1/3203* (2019.01)

(52) U.S. Cl.
CPC .............. *G06F 9/4405* (2013.01); *G06F 8/65* (2013.01); *G06F 1/3203* (2013.01)

(58) Field of Classification Search
CPC ......... G06F 9/4405; G06F 8/65; G06F 1/3203
See application file for complete search history.

(56) References Cited

U.S. PATENT DOCUMENTS

| | | | |
|---|---|---|---|
| 7,003,692 B1 * | 2/2006 | Banks | G06F 11/2038 713/1 |
| 10,025,937 B1 * | 7/2018 | Kashyap | G06F 21/604 |
| 10,135,874 B1 * | 11/2018 | Perry | H04L 63/20 |
| 2006/0069754 A1 * | 3/2006 | Buck | G06F 21/53 709/220 |
| 2008/0256526 A1 * | 10/2008 | Ellsworth | G06F 11/1433 717/168 |
| 2009/0089567 A1 * | 4/2009 | Boland, IV | G06F 8/65 713/2 |
| 2018/0048704 A1 * | 2/2018 | Li | H04L 67/1042 |

* cited by examiner

*Primary Examiner* — Jaweed A Abbaszadeh
*Assistant Examiner* — Gayathri Sampath
(74) *Attorney, Agent, or Firm* — Muirhead and Saturnelli, LLC

(57) ABSTRACT

Techniques provide for persistently storing state information regarding configuration requirements, such as STIG (Security Technical Implementation Guides) requirements. The state information may indicate whether all or one or more selected categories of requirements are enabled. The state information may be persistently stored and applied or hardened across multiple processor nodes as well as across system upgrades.

14 Claims, 13 Drawing Sheets

```
Version: 0001
usage: svc_stig [<qualifiers>] where the qualifiers are:
    -h|--help              : Display this message
    -d|--disable  [options] : Disable STIGs
    -e|--enable   [options] : Enable STIGs
    -s|--status   [options] : Get status for STIGs
    -n|--no_prompt          : Do not prompt warning message This script enables, disables, and provides current status for each
category of STIGs.

See the help text below for more information on options.

Refer to the system documentation for a complete description of STIGs
supported.

-d|--disable:
Used to Disable all STIGs (no option specified).
Options:

-c|--cat [X]  : disable a specific Category of STIGs

-e|--enable:
Used to Enable all STIGs (no option specified).
Options:

-c|--cat [X]  : enable a specific Category of STIGs

-s|--status:
Used to show the current status (enabled or disabled) for all STIGs
(no option specified).
Options:

-c|--cat [X]          : show status for a specific Category of STIGs
    -b|--boolean-format   : show boolean status for a specific Category of STIGs -n|--no_prompt:
Suppress warning prompt to user that this operation will cause the system to
reboot.
```

FIG. 5

| STIG ID | DISA STIG Severity | Requirement | Check | Fix |
|---|---|---|---|---|
| SLES-12-001329 | SLES12 CAT II | The audit.rules file must be owned by root. | Verify the "/etc/audit/audit.rules" file is owned by root by running the following command:<br><br># sudo ls -o /etc/audit/audit.rules \| cut -d " " -f3<br>root<br><br>If the owner "root" is not returned, this is a finding. | Configure the "/etc/audit/audit.rules" file to be owned by root with the following command:<br><br># sudo chown root /etc/audit/audit.rules |

FIG. 8

TECHNIQUES FOR PERSISTING AND MODIFYING CONFIGURATION REQUIREMENT STATE INFORMATION IN A MULTIPLE NODE SYSTEM

BACKGROUND

Technical Field

This application generally relates system compliance in accordance with specified requirements and guidelines.

Description of Related Art

Systems may include different resources used by one or more host processors. Resources and host processors in the system may be interconnected by one or more communication connections, such as network connections. These resources may include, for example, data storage devices such as those included in the data storage systems manufactured by Dell Inc. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may issue I/O operations, such as data read and write operations, received at a data storage system. Host systems may store and retrieve data by issuing the I/O operations to the data storage system containing a plurality of host interface units, disk drives (or more generally storage devices), and disk interface units. Such data storage systems are provided, for example, by Dell Inc. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

In accordance with one aspect of the techniques herein is a method of system hardening comprising: receiving a command enabling configuration requirements in a system that includes a first processor and a second processor, wherein the first processor has a first configuration and is configured as an active processor that services received requests, and wherein the second processor has a second configuration and is configured as a passive processor that does not service received requests; persistently storing state information regarding the configuration requirements enabled by the command; modifying, in accordance with the state information, the second configuration of the second processor to apply and thereby harden the configuration requirements in the second configuration of the second processor; rebooting the second processor that executes using the second configuration that has been hardened; modifying, in accordance with the state information, the first configuration of the first processor to apply and thereby harden the configuration requirements in the first configuration of the first processor; rebooting the first processor that executes using the first configuration that has been hardened; and during said rebooting of the first processor, the first processor configured as the active processor becomes unavailable and triggers a switchover whereby the second processor is configured as the active processor that services received requests and the first processor is configured as the passive processor that does not service received requests. At any point in time, a single one of the first and the second processors may be configured as the active processor that services management commands received over a control path, and wherein a remaining one of the first and the second processors may be configured as the passive processor and does not service management commands received over the control path. Wherein prior to receiving the command, the system may have all the configuration requirements disabled. The configuration requirements may include a plurality of categories and the state information may indicate whether any of the configuration requirements are enabled for the system. The state information may indicate whether one or more selected categories of the plurality of categories of the configuration requirements are enabled for the system. The command may enable the one or more selected categories of the configuration requirements and the state information regarding the configuration requirements may indicate that the one or more selected categories of the configuration requirements are enabled. The method may also include issuing a second command that disables the one or more selected categories of the configuration requirements; and persistently storing state information regarding the configuration requirements to indicate that the one or more selected categories of the configuration requirements are disabled. The method may include: installing a new upgraded image on the first processor currently configured as the passive processor, wherein said installing configures the first processor to have a third configuration; and rebooting the first processor using the new upgraded image, wherein said rebooting includes: reading the persistently stored state information regarding the configuration requirements; and modifying, in accordance with the state information, the third configuration of the first processor to apply, and thereby harden, enabled ones of the configuration requirements in the third configuration of the first processor. The method may include: installing the new upgraded image on the second processor currently configured as the active processor, wherein said installing configures the second processor to have a fourth configuration; and rebooting the second processor using the new upgraded image, wherein said rebooting includes: reading the persistently stored state information regarding the configuration requirements; and modifying, in accordance with the state information, the fourth configuration of the second processor to apply, and thereby harden, enabled ones of the configuration requirements in the fourth configuration of the second processor. During rebooting of the second processor configured as the active processor, the second processor may become unavailable and trigger a switchover whereby the first processor is configured as the active processor that services received requests and the second processor is configured as the passive processor that does not service received requests. The new upgraded image may include a first configuration requirement that is any of: a new configuration requirement not included in either the first configuration or the second configuration, and a revised configuration requirement that is a modified version of an existing requirement included in both the first configuration and the second configuration. After said rebooting the first processor, said first configuration requirement may be hardened in the third configuration, and wherein after said rebooting the second processor, said first configuration requirement may be hardened in the fourth configuration.

In accordance with another aspect of the invention is a system comprising: a first processor and a second processor; and a memory comprising code stored thereon, that when executed, performs a method of system hardening comprising: receiving a command enabling configuration requirements in the system, wherein the first processor has a first configuration and is configured as an active processor that services received requests, and wherein the second processor has a second configuration and is configured as a passive processor that does not service received requests; persistently storing state information regarding the configuration requirements enabled by the command; modifying, in accordance with the state information, the second configuration of the second processor to apply and thereby harden the configuration requirements in the second configuration of the second processor; rebooting the second processor that executes using the second configuration that has been hardened; modifying, in accordance with the state information, the first configuration of the first processor to apply and thereby harden the configuration requirements in the first configuration of the first processor; rebooting the first processor that executes using the first configuration that has been hardened; and during said rebooting of the first processor, the first processor configured as the active processor becomes unavailable and triggers a switchover.

In accordance with another aspect of the invention is a computer readable medium comprising code stored thereon that, when executed, performs a method of system hardening comprising: receiving a command enabling configuration requirements in a system that includes a first processor and a second processor, wherein the first processor has a first configuration and is configured as an active processor that services received requests, and wherein the second processor has a second configuration and is configured as a passive processor that does not service received requests; persistently storing state information regarding the configuration requirements enabled by the command; modifying, in accordance with the state information, the second configuration of the second processor to apply and thereby harden the configuration requirements in the second configuration of the second processor; rebooting the second processor that executes using the second configuration that has been hardened; modifying, in accordance with the state information, the first configuration of the first processor to apply and thereby harden the configuration requirements in the first configuration of the first processor; rebooting the first processor that executes using the first configuration that has been hardened; and during said rebooting of the first processor, the first processor configured as the active processor becomes unavailable and triggers a switchover whereby the second processor is configured as the active processor that services received requests and the first processor is configured as the passive processor that does not service received requests. At any point in time, a single one of the first and the second processors may be configured as the active processor that services management commands received over a control path, and wherein a remaining one of the first and the second processors may be configured as the passive processor and does not service management commands received over the control path. Prior to receiving the command, the system may have all the configuration requirements disabled. The configuration requirements may include a plurality of categories and the state information indicates whether any of the configuration requirements are enabled for the system. The state information may indicate whether one or more selected categories of the plurality of categories of the configuration requirements are enabled for the system. The command may enable the one or more selected categories of the configuration requirements, and the state information regarding the configuration requirements may indicate that the one or more selected categories of the configuration requirements are enabled. The method may include: issuing a second command that disables the one or more selected categories of the configuration requirements; and persistently storing state information regarding the configuration requirements to indicate that the one or more selected categories of the configuration requirements are disabled.

BRIEF DESCRIPTION OF THE DRAWINGS

Features and advantages of the present invention will become more apparent from the following detailed description of exemplary embodiments thereof taken in conjunction with the accompanying drawings in which:

FIG. 5 is an example of a command line script that may be used to enable and disable configuration requirements in an embodiment in accordance with techniques herein;

FIGS. 8 and 9 illustrate more detail regarding a first configuration requirement that may be used in an embodiment in accordance with techniques herein.

DETAILED DESCRIPTION OF
EMBODIMENT(S)

Figure 1:
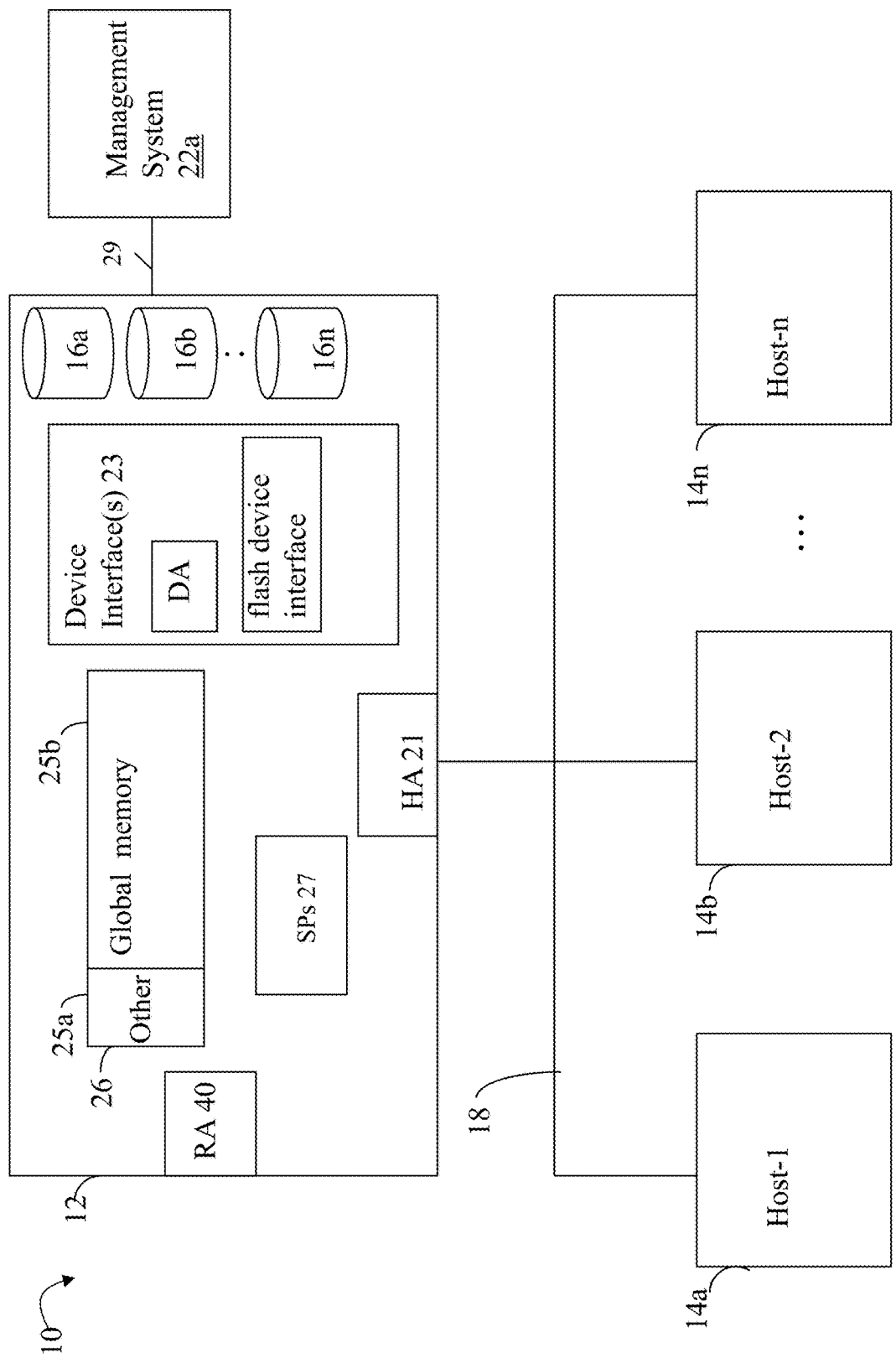
FIGS. 1, 2, 3 and 6 are examples of components that may be included in a system in accordance with techniques described herein.

Referring to FIG. 1, shown is an example of an embodiment of a system that may be used in connection with performing the techniques described herein. The system 10 includes a data storage system 12 connected to host systems 14*a*-14*n* through communication medium 18. In this embodiment of the computer system 10, and the n hosts 14*a*-14*n* may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrated the techniques herein, reference may be made to a single data storage array by a vendor, such as by Dell Inc. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices 16a-16n. The data storage devices 16a-16n may include one or more types of data storage devices such as, for example, one or more rotating disk drives and/or one or more solid state drives (SSDs). Generally, elements 16a-n may denote the non-volatile backend physical storage devices used to store data in a persistent manner in the data storage system. An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by Dell Inc., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

In connection with performing techniques herein, an embodiment of the data storage system may include multiple SPs such as denoted by element 27 of FIG. 1 for performing processing in connection with servicing requests. Additionally, the two SPs may be used in connection with failover processing when communicating with the management system 22*a*. Client software on the management system 22*a* may be used in connection with performing data storage system management by issuing control path commands to the data storage system 12 and/or receiving responses from the data storage system 12 over connection 29.

Figure 2:
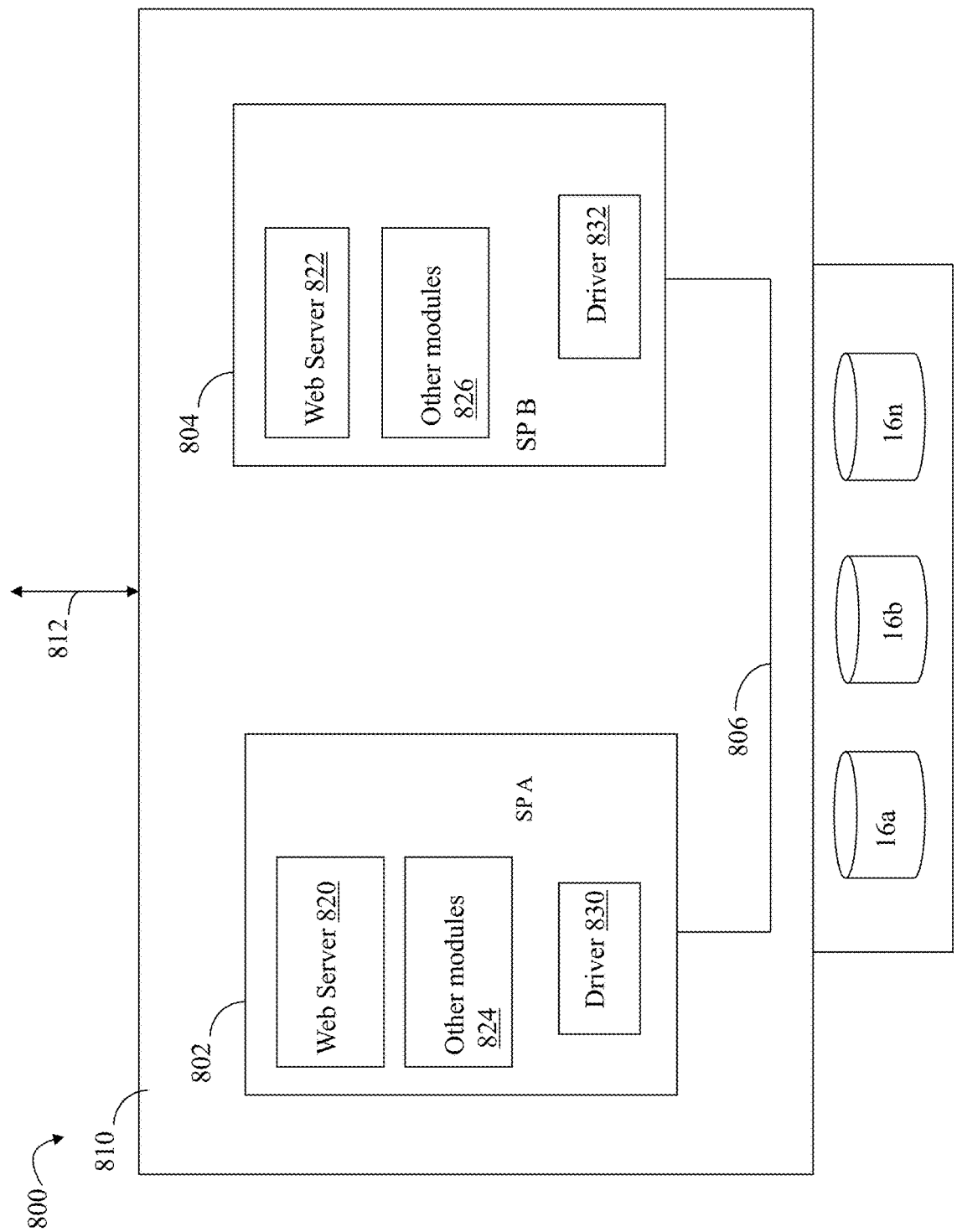

Referring to FIG. 2, shown is a block diagram of components that may be included in a data storage system 810. In the example 800, there are two SPs 802, 804 although a data storage system and techniques herein may be used in an embodiment in which the data storage system includes more than two SPs. SP A 802 includes a web server 820, other modules 830, and driver 830. SP B 804 includes a web server 822, other modules 826, and driver 832. SP A 802 and SP B 804 may communicate using 806 which is described in more detail below. Element 812 may represent a communication connection used for data storage system management transmissions between the data storage system 810 and one or more external clients. The web servers 820 and 822 may be software modules included in data storage system management software residing and executing on the data storage system 810. The web servers 820 and 822 may be used in connection with communicating with external clients over network connection 812.

The two SPs 802, 804 may control the operation of the data storage system. The SPs or processors may be configured to process requests as may be received from the hosts, other data storage systems, a management system, and other components connected thereto. Each of the SPs 802, 804 may process received requests and operate independently and concurrently with respect to the other SP. In the example 800, each of SP A, SP B is illustrated as having one or more software modules (e.g., web server, other modules, driver) executing thereon. An embodiment may have a same set of one or more software modules executing on each SP so that either of the SPs may service a received request. The example 800 may illustrate the state of the data storage system with software modules that are loaded as a result of booting the data storage system. In the example 800, the SPs 802 and 804 have successfully completed the boot process leaving both 802 and 804 in what may be characterized as a healthy or available state with respect to data storage system management functionality. An SP may be characterized as being in the healthy or available state if the SP has the ability to service normal data storage system management messaging traffic over a communication connection, such as a network connection, used for data storage management. Otherwise, the SP may be characterized as unhealthy or unavailable. Once booted, an SP may transition between the states of healthy/available and unhealthy/unavailable in accordance with problems, SP reboots, and the like, that may occur and/or be corrected over time.

With respect to data storage management requests, operations, and the like, as may be received from a client, such as the management system 22*a* of FIG. 1 in connection with the techniques herein, the client may interact with a designated one of the two SPs 802, 804 over the communication connection 812. The designated one of the SPs may be characterized as the currently active SP with the other remaining peer SP designated as the passive SP. The passive SP may assume the role of active if the currently active SP becomes unhealthy or is otherwise unavailable for servicing requests.

In connection with techniques herein, the web server may operate in accordance with an active-passive model when communicating with the management system 36. In accordance with the active-passive model, only one instance of the web server is active at a time so that one of the SPs 802, 804, and the instance of the web server and other code executing thereon, are designated as a "active" with the other SP and web server instance and other code executing thereon designated as "passive".

In the example 800, instances of the web server 820, 822 executing, respectively, on SPs 802, 804 may communicate over connection 806 using lower-level components, such as drivers 830, 832. The connection 806 may be a bus or other communication connection to facilitate inter-processor communication between the drivers. The connection 806 may be characterized as internal to the data storage system or local with respect to residing on the data storage system and used for communicating between components on the data storage system. The connection 806 may be characterized as part of an internal network over which inter-processor communications may occur. Thus, one of the SPs may use connection 806 to communication with the other SP. Each of the SPs 802, 804 may include code which facilitates communication with the other SP using the connection 806 for inter-SP communication. In particular, code of an SP may use connection 806 to instruct the other peer SP to perform commands such as for data storage system management of the other SP.

The SPs 802, 804 may also communicate over another connection 812. The connection 812 may represent a TCP/IP or other network connection over which instances of the web server 820, 822 on processors 802, 804 may communicate with other externally networked components. Connection 812 may correspond to a single logical connection used, for example, to communicate with a client such as the management system 22*a* running the web browser displaying a GUI (graphical user interface). The connection 812 may be characterized as the communication connection between the data storage system and the management system over which the user on the management system 22*a* interacts with the data storage system in performing data storage system management tasks. The SPs 802, 804 may send and/or receive transmissions over connection 812 from the management system 22*a* of FIG. 1. In one embodiment, the connection 812 may be part of a dedicated LAN connection for management operations. Host I/O requests may be received at the data storage system on different incoming ports such as, for example, Fibre channel or iSCSI ports not illustrated.

In at least one embodiment, only one of the SPs 802, 804 may be designated as active at any time in connection with servicing management commands or requests received over the control path. Thus, at any point in time, at most one web server of the active SP communicates with a client in connection with handling data storage system management transmissions over the connection 812 in connection with control path commands. In the event that an active SP transitions from a healthy/available state to an unhealthy/unavailable state, the passive SP assumes the role of active (assuming it is in a healthy/available state). In connection with techniques herein, when failover processing results in an SP assuming the role of active, the web server thereon may also be designated as the web server instance which is active and communicates with the client. As described herein, an SP may be characterized as having an unhealthy or unavailable state if the web server thereon is not able to communicate with, and process requests from, the external client, such as the management system 22a, over a network.

The connection 812 may have a single network address, such as an IP address, over which the active processor and code executing thereon may communicate with the management system 22a in connection with performing the techniques herein. The other modules 824 and 826 may represent other code as described herein in more detail on each of the processors. It should be noted that the data storage system 810 of the example 800 includes other components, such as storage devices, which are omitted from the example 800 for simplicity in illustrating the dual SPs 802, 804. Additionally, information may be shared between the SPs 802, 804 and may also be stored persistently, such as on one or more of the non-volatile physical storage devices 16a-n. Such information may include various configuration options or settings and other general state information that may be required to be shared between the SPs 802, 804 in connection with transitioning to the active SP and performing processing in accordance with techniques herein. It should be noted that, in at least one embodiment, the designation of a single SP as active servicing management/control path request and the remaining peer SP as passive applies in connection with the control path and requests received thereon. In connection with the data path or I/O path, in at least one embodiment, both SPs 802, 804 may be designated as active with respect to servicing I/O requests received (e.g., both SPs 802, 804 may service I/O requests received over the data or I/O path, whereby only a single designated active one of the two SPs services control path commands).

The Defense Information Systems Agency (DISA) is the entity responsible for maintaining the security posture of the Department of Defense (DoD) IT infrastructure. One of the ways DISA accomplishes this task is by developing and using "STIGs"—Security Technical Implementation Guides. Generally, STIGS specify configuration requirements in two areas—policy requirements for security programs, and best practices for Information Assurance (IA)-enabled applications. In one aspect, STIGs may be characterized as alternate configurations that make commonly used applications more secure. All DoD IT assets must meet STIG compliance in some fashion before they are allowed to operate on DoD networks. Changing the configurations in compliance with the STIG requirements, often referred to as STIG hardening, typically requires a lot of manual intervention and causes upgrade concerns. A specific product will have a set of STIGs applicable depending on the operating system, network stack and web server implementation.

In following paragraphs, reference may be made to particular embodiments related to a data storage system. However, those skilled in the art will readily appreciate that such techniques described herein are applicable for use in any suitable system. As noted above, hardening means to make a system compliant with specified requirements. For example, in connection with a data storage system, such requirements of a STIG may relate to webserver access, network interface or access to the data storage system (e.g., firewall rules), operating system requirements, and requirements of files (e.g., ownership, access permissions) and databases on the data storage system. In at least one embodiment, the data storage system may include a webserver embedded thereon where an external client may issue management requests (such as over the control path) to the webserver of the data storage system. STIG requirements may, for example, limit or restrict the ability to communicate with the webserver 820, 822 for security purposes and then further require monitoring requested and granted access such as by enabling tracking and auditing of user logins, failed login attempts, and the like. In connection with particular control path commands requested or requests to access a database or file on the data storage system, STIGs may specify a required level of permission needed to have access, perform particular operations, and the like.

Described herein are techniques that may be used in connection with STIG hardening on a system such as a data storage system. Techniques herein provide a framework to persist state information regarding a current STIG mode setting. For example, such persisted STIG mode state information may denote whether STIG requirements are enabled or disabled, particular STIG categories which are enabled/disabled, whether STIG requirements are enabled/disabled for ALL STIG categories, and the like. Such techniques provide for hardening across multiple SPs or nodes and persisting the STIG mode setting across system upgrades (where the persistently stored STIG mode state information denotes the STIG mode setting that is automatically applied in connection with the system upgrade). For example, a data storage system upgrade image may be installed whereby previously persisted STIG mode state information is retrieved and automatically applied in connection with the upgrade image. STIG requirements of the newly installed upgrade image are automatically applied or hardened consistent with the previously persisted STIG mode state information. Additionally, techniques herein provide the flexibility to turn ON or OFF STIG requirements (e.g., enable or disable STIG requirements such as all requirements or selected categories) as may be needed depending on the different customer environments. Techniques herein may be performed in an automated manner without user or manual intervention. Techniques herein also provide for reverting (e.g., disabling or turning off) STIG hardening by persisting disabled STIG requirements (e.g., all requirements or selected categories).

As described herein, an embodiment in accordance with techniques herein has a mode to enable/disable STIG requirements and associated hardening. The foregoing provides an optional mode as to whether to enable/disable STIG requirements whereby one may selectively choose to apply STIG requirements depending on the particular compliance and security needs that may vary over time. The foregoing flexibility provided as a benefit of techniques herein may not be available in connection with other systems such as ones where STIG hardening and application cannot be selectively specified as enabled or disabled. The scope of security hardening and vulnerabilities is constantly changing and techniques herein provide a flexible framework to apply revised or modified STIG requirements. In certain embodiments and at certain times, it may be desirable to disable STIG requirements and hardening if the enhanced security restrictions and limits applied to resources are not needed. Thus, techniques herein provide the flexible framework to selectively enable or disable STIG requirements and hardening in each particular embodiment.

Figure 3:
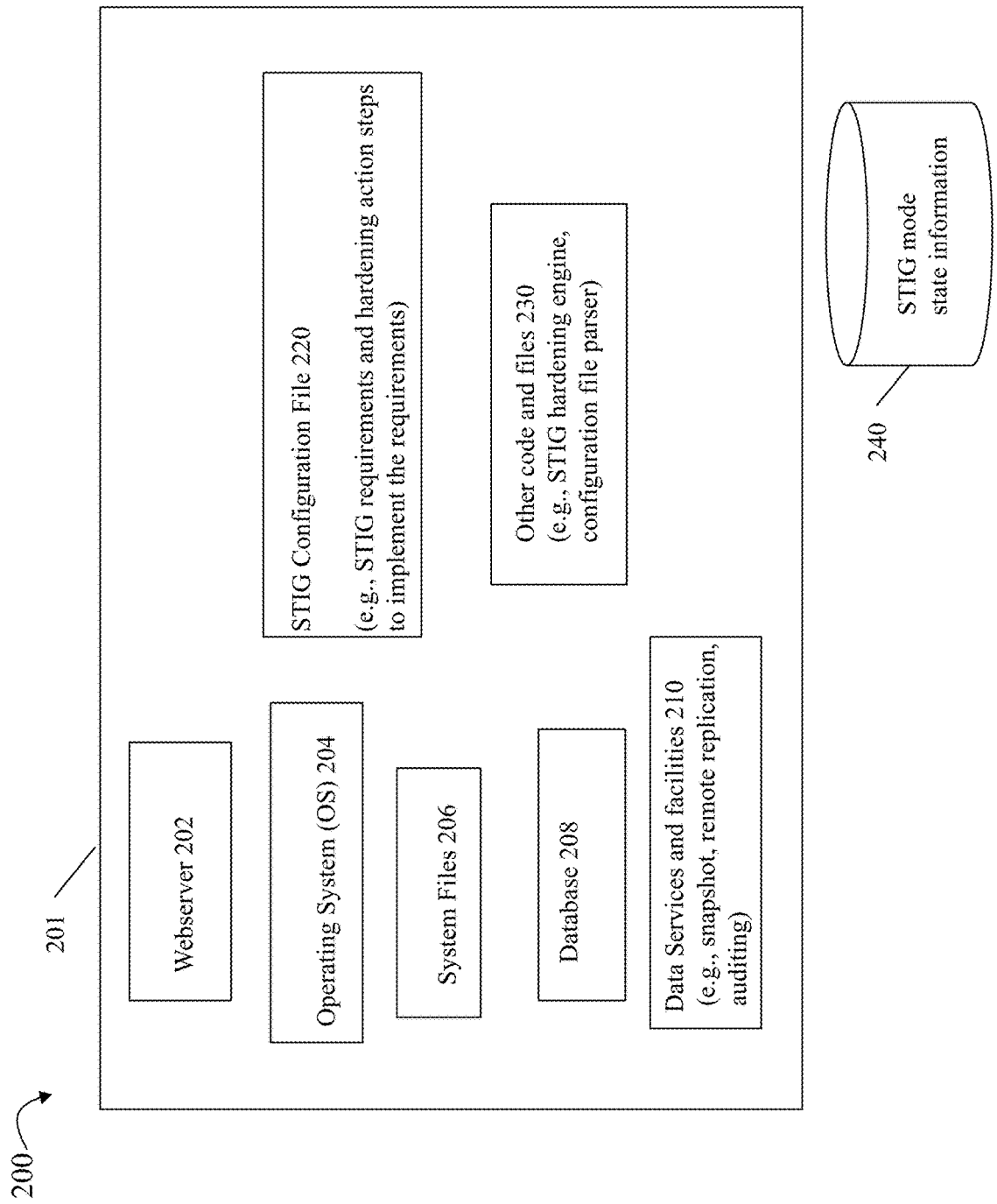

Referring to FIG. 3, shown is an example 200 of components that may be included in a system image 201 as installed and included in a first system configuration on SP A 802, and as also installed and included in a second system configuration on SP B 804. Generally, the system image 201 may include a webserver 202, operating system (OS) 204, system files 206, database 208, code for data services and facilities 210 (e.g., such as for snapshots, remote replication, auditing), STIG configuration file 220 and other code and files 230. The STIG configuration file 220 (also sometimes referred to herein as a configuration file) may generally include STIG requirements and actions or steps taken to harden or implement the requirement. Thus, performing the actions or steps results in modifying aspects of other components of the configuration. For example, a STIG requirement may include modifying a permission, owner or other attribute of a file (e.g., such as one of the system files 206). To implement the requirement, a command may be issued to perform the necessary change in permission or ownership as specified in the requirement. In this case, the configuration file 220 specifies the requirement as well as the command executed to implement or harden the requirement in the configuration. In this manner, the system image includes the necessary STIG requirements that may possibly be enabled and which are relevant to the services, features, functionality, and the like, included in a component of the image 201.

In the case where a new upgraded system image is issued for installation and use on the system and its SPs 802, 804, the new upgraded system image may include additional new components and/or revised versions of existing components in comparison to components of an existing installed image and configuration on the SPs 802, 804. The new upgraded system image may also have had a component removed in comparison to components of an existing installed image and configuration on the SPs 802, 804 (e.g., component included in configuration of 802, 804 which is not included in the new upgraded system image). The new upgraded system image may also include revised STIG requirement, new STIG requirement, and/or have had a STIG requirement removed in comparison to STIG requirements included in an existing installed image and configuration on the SPs 802, 804.

Generally, STIG requirements in an embodiment in accordance with techniques herein may include multiple categories of requirements, such as category (CAT) 1, CAT 2 and CAT 3. Generally, an embodiment may include any suitable number of categories. In at least one embodiment, the categories may indicate different levels of severity of security or other requirements with highest severity associated with the lowest category number. Thus, the severity associated with a particular category of requirements decreases as the category number increases (e.g., ranked severity from highest to lowest may be CAT 1, CAT 2, CAT 3).

The other code and files 230 may generally denote other code and files that may be included in a system image and configuration of an SP. For example, element 230 may include an engine used in connection with hardening a configuration, a configuration file parser that parses the configuration file 220, and the like.

Element 240 may denote the persistently stored STIG mode state information described in more details below. Generally, element 240 may be any persistent storage that is shared by the SPs 802, 804. For example, in at least one embodiment, element 240 may be system LUN that has its storage provisioned on the data storage system. The system LUN is accessible and shared by the SPs 802, 804 and may indicate whether STIG requirements are enabled or disabled for the system, and thus, for the SPs 802, 804. If all STIG requirements are disabled, then all categories of all STIGs are disabled. If all STIG requirements are enabled, then all categories of STIG requirements are enabled.

An embodiment may further provide support for finer granularity of control in enabling and disabling STIG requirements for the system. For example, an embodiment may provide support for enabling and disabling STIG requirements by category. For example, STIG requirements of CAT 1 only may be enabled or STIG requirements of both CAT 1 and CAT 3 may be enabled. Once enabled, an embodiment may further provide support for explicitly disabling one or more specified categories of STIG requirements. For example, at a first point in time, CAT 1 and CAT 3 requirements may be enabled. At a second later point in time, CAT 3 requirement may be disabled whereby the net result is that only CAT 1 STIG requirements are enabled. The STIG mode state information 240 may reflect the current state of the STIG mode requirements at a point in time and indicate whether STIG requirements are enabled or disabled. Furthermore, if enabled, the information in 240 identify which one or more of the categories are currently enabled. As particular categories are enabled or disabled, or as all STIG requirements may be enabled or disabled, the information in 240 may be accordingly updated. In at least one embodiment, one or more commands may be executed to provide for enabling and disabling STIG requirements such as by executing a script as described in more detail elsewhere herein.

An embodiment may also include support for enabling and disabling STIG requirements based on other granularities or groupings. For example, an embodiment may include support for enabling and disabling STIG requirements based on defined groupings of services or functional areas (e.g., all data protection services which may include snapshot, remote replication, and local replication; all file operations such as to create a file, and delete a file; all file metadata requirements such as related to file permissions and ownership).

In connection with techniques herein, processing is described in an embodiment including two SPs, such as 802 and 804 of FIG. 2. However, more generally, techniques herein may be used in an embodiment have any suitable number N of SPs, such as generally where N is two (2) or greater. Also, for purposes of illustration in connection with servicing management/control path commands, one of the two SP nodes, such as SP A 802, may be initially configured as the active SP and the remaining peer SP B configured as the passive SP. However, more generally, any one of the SP nodes may be designated as active with remaining peer SP designated as passive.

Figure 4A:
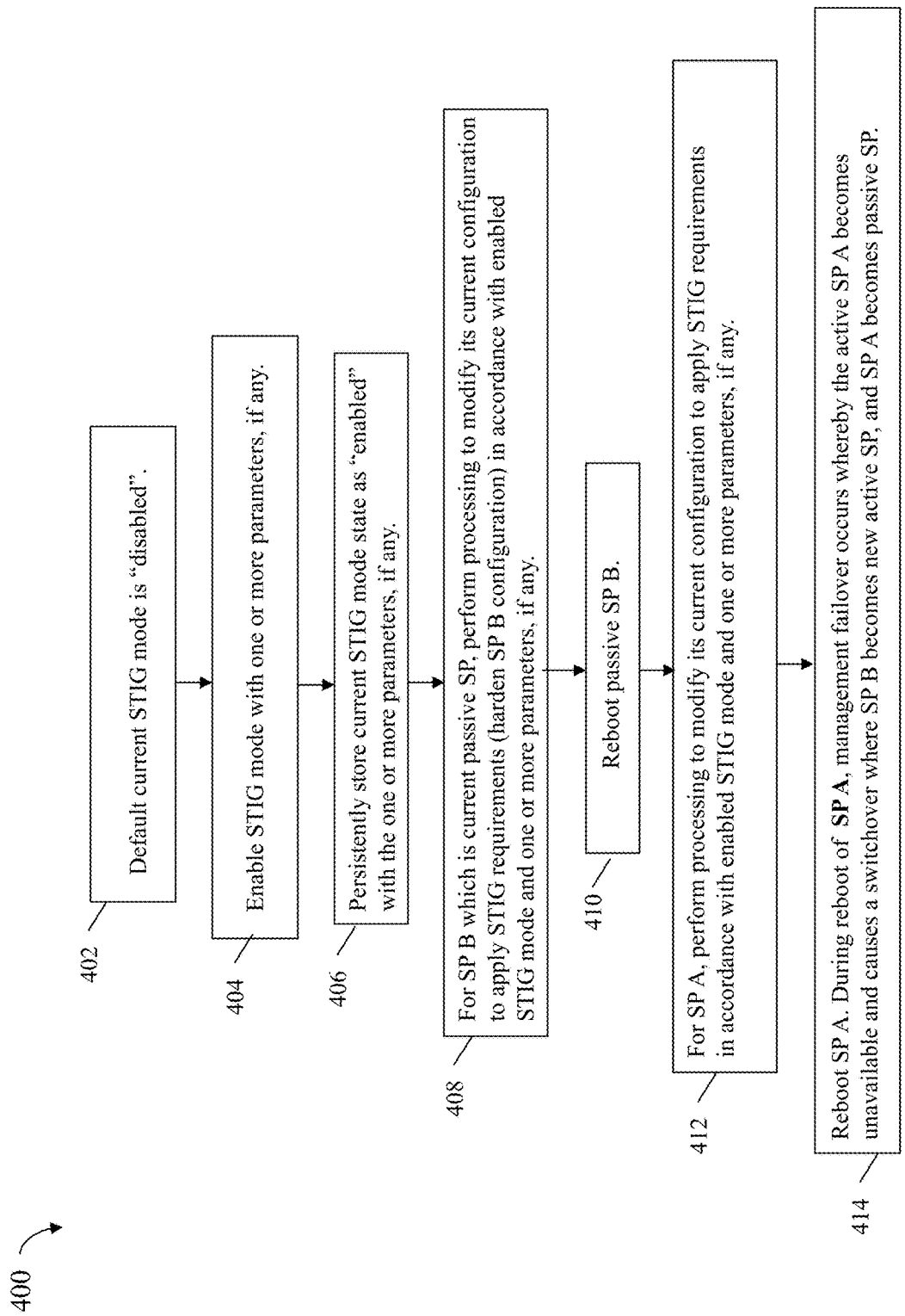
FIGS. 4A, 4B and 4C are flowcharts of processing steps that may be used in an embodiment in accordance with techniques herein.

Referring to FIG. 4A, shown is a first flowchart 400 of processing steps that may be performed in an embodiment in accordance with techniques herein. At step 402, the starting state of the STIG mode of the system may be the default where all STIG requirements are disabled. At step 404, a command may be issued to enable STIG mode with one or more parameters. In at least one embodiment in accordance with techniques herein, the one or more parameters may, for example, identifying one or more specific categories for which STIG mode is enabled. For example, assume the command of step 404 enabled STIG mode for only CAT 1 STIG requirements whereby remaining STIG requirements are not to be enabled/remain disabled. From step 404, control proceeds to step 406 where information regarding the STIG mode state may be persistently stored, such as on the shared system LUN 240. The information persistently stored in step 406 may indicate that only CAT1 STIG requirements are enabled. Subsequent processing steps may now be performed that modify the existing configurations of the SPs 802, 804 to have hardened configurations in accordance with the newly enabled CAT 1 STIG requirements that have been persistently stored in step 406. From step 406, control proceeds to step 408.

In this example, assume that SP A 802 is configured as the active processor servicing control path or management requests and that SP B 804 is configured as the passive processor that does not service such control path requests. In step 408, for SP B which is the passive SP, processing may be performed to modify its current configuration to apply STIG requirements (harden SP B configuration) in accordance with the enabled STIG mode and one or more parameters as persistently stored in step 406. From step 408, control proceeds to step 410 where processing is performed to reboot the passive SP B. At this point after SP B reboots, there is no change in active/passive status—SP A is still configured as the active SP and SP B is still configured as the passive SP.

From step 410, control proceeds to step 412. In step 412, for SP A which is currently configured as the active SP, processing may be performed to modify its current configuration to apply STIG requirements (harden SP A configuration) in accordance with the enabled STIG mode and one or more parameters as persistently stored in step 406. From step 412, control proceeds to step 414 where processing is performed to reboot the active SP A. During the reboot of SP A, management failover occurs whereby the active SP A becomes unavailable and causes a coordinated switchover where SP B now becomes the active SP, and SP A (currently in the process of rebooting) is configured as the passive SP. The switchover as performed in step 412 and elsewhere herein may be performed in a non-disruptive manner with respect to maintaining availability of the data storage system. From the perspective of a client issuing I/O requests on the data path, or administrative commands over the control path, one of the SPs 802, 804 may always be available to service received requests or commands over both the data path and control path.

In connection with steps 410 and 414, the newly hardened configurations of SP A 802 and SP B 804 are rebooted to thereby have the SPs 802, 804 perform processing in accordance with the hardened STIG requirements enabled in step 404. Steps 408 and 412 may include reading the persistently stored STIG mode state information 240 for use in connection with modifying the configurations, respectively of SP B 804 and SP A 802.

Figure 4B:
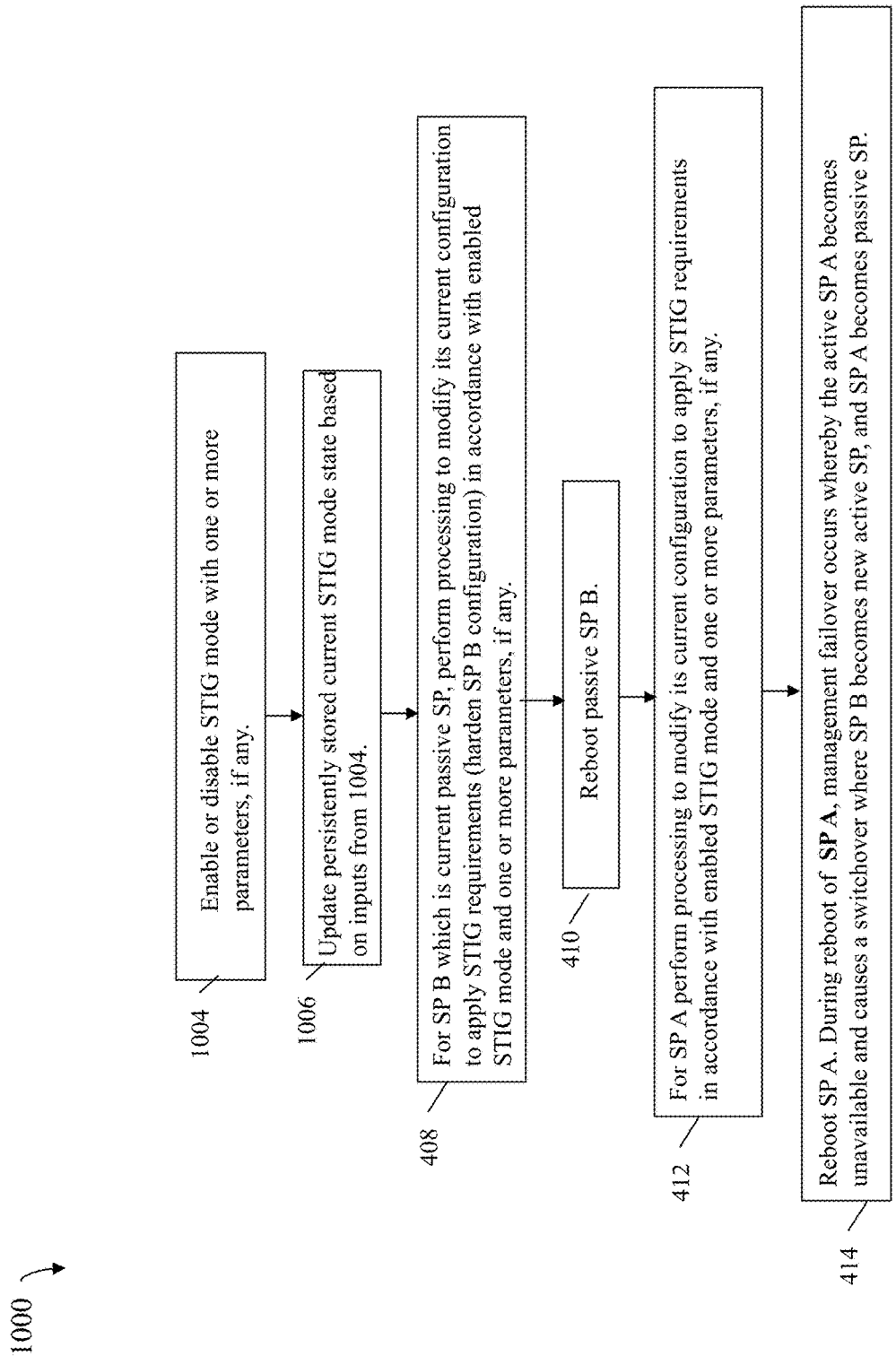

Referring to FIG. 4B, shown is a second flowchart 1000 of processing steps that may be performed in an embodiment in accordance with techniques herein. The flowchart 1000 steps may be performed subsequent to having previously performed the flowchart 400. The flowchart 1000 may be performed, for example, in connection with a user subsequently issuing commands to further enable or disable STIG requirements such as for all categories or one or more selected categories. Assume we are continuing with the example above whereby the user has enabled CAT 1 STIG requirements. Now, assume in step 1004 that another command is executed that enables STIG requirements for ALL categories. From step 1004, control proceeds to step 1006 to update the persistently stored STIG mode state information based on the inputs from step 1004. For example, step 1006 in this example results in updating the STIG mode state information 240 to indicate that all STIG categories have requirements enabled. From step 1006, control proceeds to perform step 408, 410, 412 and 414 as described in connection with flowchart 400. The steps of flowchart 1000 may be generally performed responsive to each further enablement or disablement of STIG mode requirements.

Figure 4C:
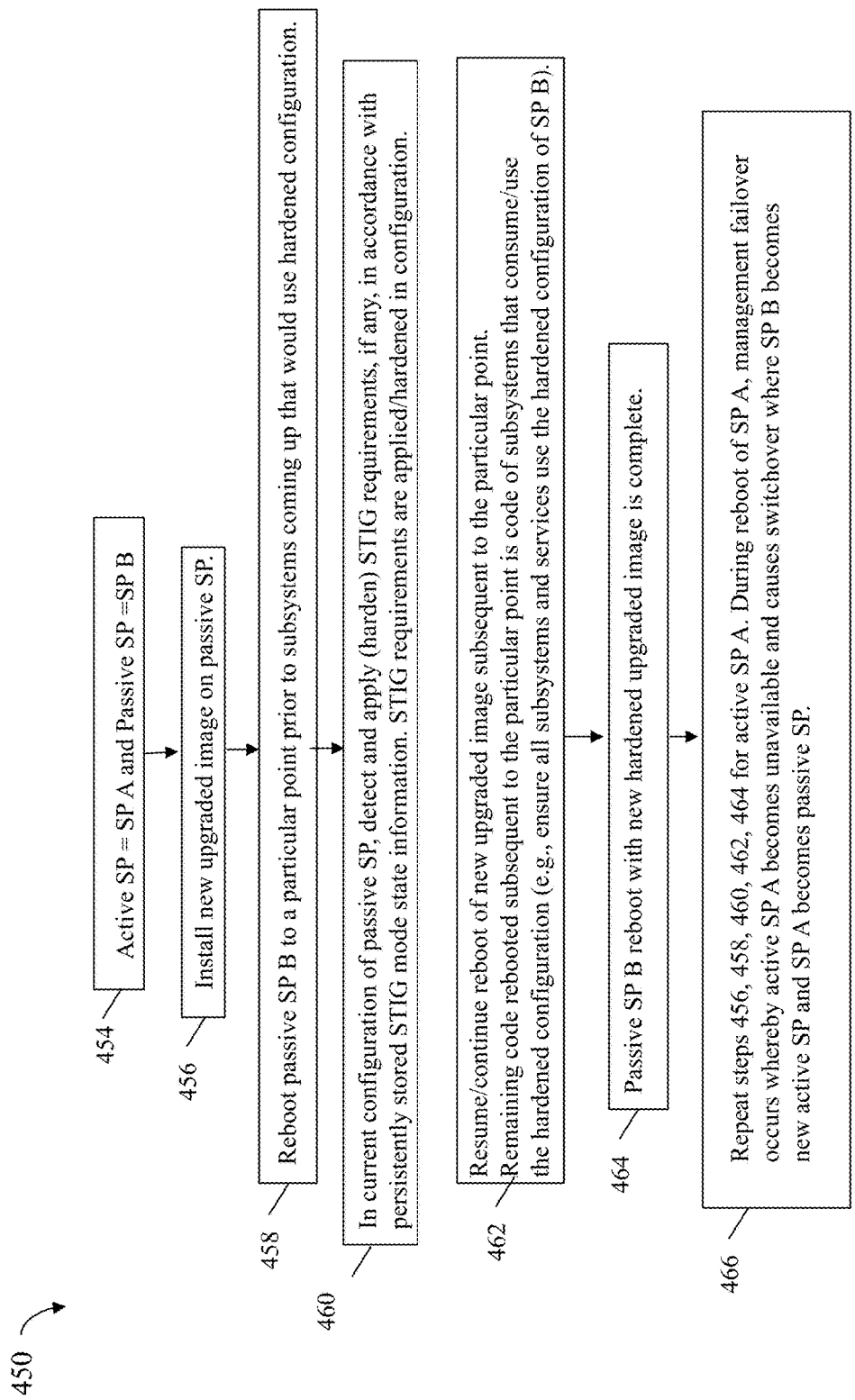

Referring to FIG. 4C, shown is a third flowchart 450 of processing steps that may be performed in an embodiment in accordance with techniques herein. The steps of flowchart 450 may be performed to install a new upgraded image on the data storage system. In step 454, assume that SP A is configured as the active SP and SP B is configured as the passive SP. From step 454, control proceeds to step 456 to install the new upgraded image on the passive SP B. From step 456, control proceeds to step 458 to reboot the passive SP B up to a particular point in the boot process. The particular point in the boot process may be characterized as a point in the boot process prior to where the subsystems of SP B are started where such subsystems would use the hardened configuration. From step 458, control proceeds to step 460. In step 460, the persisted STIG mode state information 240 may be read. Step 460 may also include hardening or applying the STIG requirements as specified in the persistent STIG mode state information. For example, assume the persistent STIG mode state information indicates that STIG mode is enabled for all categories. In this case, step 460 includes modifying the configuration of SP B (that now includes the new upgraded image components) to apply and thus harden the STIG requirements in accordance with the persistently stored STIG mode state information. From step 460, control proceeds to step 462. In step 462, the rebooting of the passive SP B is resumed or continued (using the new upgraded image) subsequent to the particular point at which the reboot was stopped or paused in step 458. The remaining code rebooted subsequent to the particular point in the boot code is code of the subsystems that consume or use the hardened configuration (e.g., hardened in step 460). Thus, the partitioning of the boot processing up to the particular point in step 458 which is then resumed from the particular point in step 462 ensures that all subsystems and services use the hardened configuration of SP B based on the new upgraded image.

From step 462, control proceeds to step 464 where the passive SP B reboot using the new hardened upgraded image is complete. After completion of step 464, SP B is still configured as the passive SP, and SP A is still configured as the active SP. From step 464, control proceeds to step 466. At step 466, steps 456, 458, 460, 462 and 464 are repeated for the active SP A. During the reboot of SP A, a management failover occurs whereby the active SP A becomes unavailable and causes a switchover where SP B becomes the new active SP, and SP A transitions to the role of the passive SP. The foregoing management failover and switchover in active and passive roles between SPs is similar to other processing described herein (e.g., such as in connection with step 414 of FIGS. 4A and 4B).

Referring to FIG. 5, shown is an example illustrating commands that may be issued in connection with enabling and disabling STIG requirements in an embodiment in accordance with techniques herein. The example 300 illustrates a command line invocation of a script where the command line may specify qualifiers to enable or disable STIGs. Element 310 provides general command line syntax and qualifiers that may be specified. Element 320 provides further detail regarding the "-d" or "disable" qualifier that may be used to disable all STIG requirements or selectively disable a requirements for a specified STIG category (using the -cat option). Element 330 provides further detail regarding the "-e" or "enable" qualifier that may be used to enable all STIG requirements or selectively enable a requirements for a specified STIG category (using the -cat option). Element 340 provides further detail regarding the "-s" or "status" qualifier that may be used to show the current status (enable or disabled) for all STIG categories or for a specified STIG category (e.g., using the -cat or -boolean option).

Figure 6:
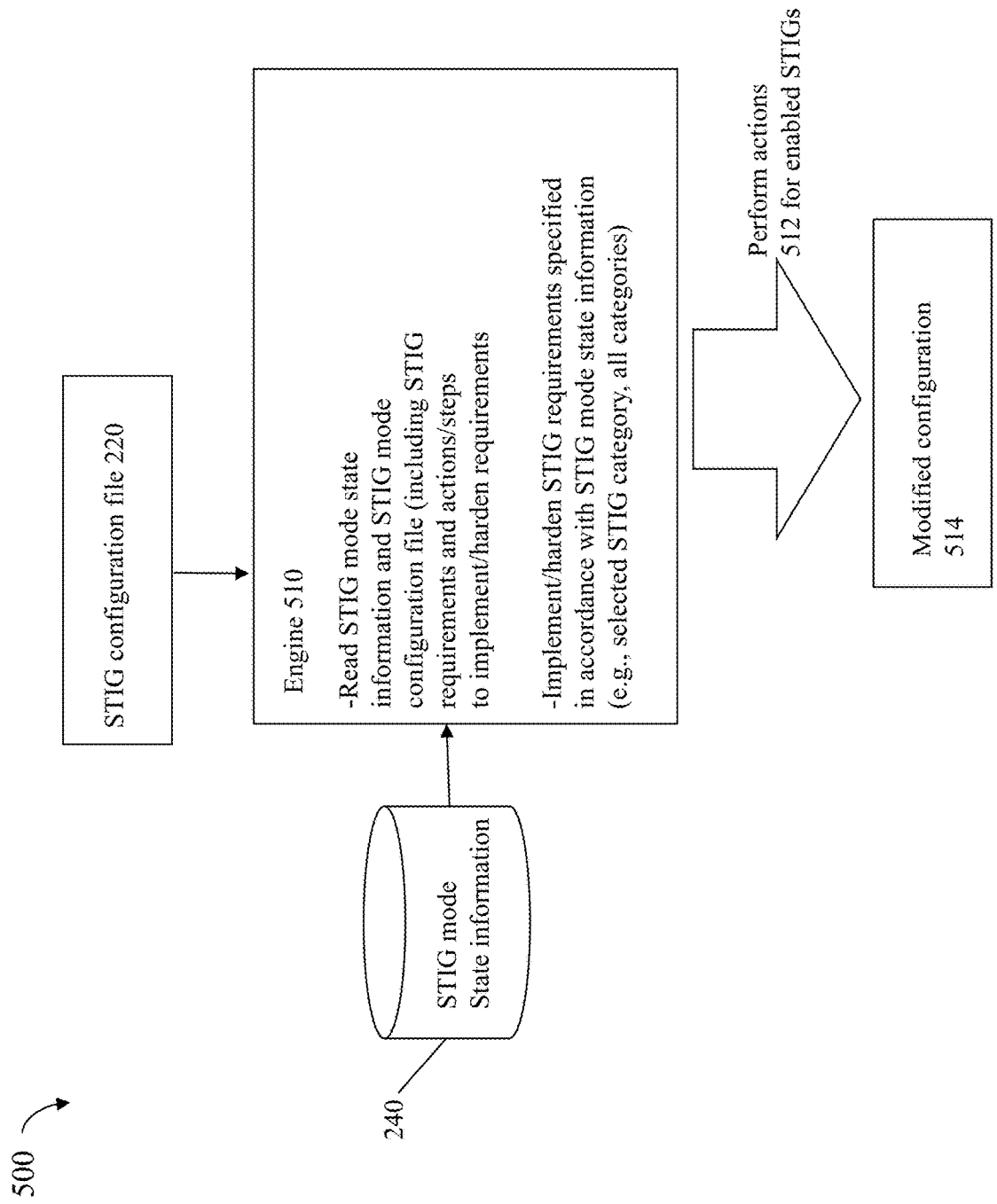

Referring to FIG. 6, shown is an example 500 of components that may be used in an embodiment in accordance with techniques herein. The engine 500 may include code that performs processing to read the persistently stored STIG mode state information 240 and the STIG configuration file 220 (of the currently installed configuration for an SP). Consistent with discussion elsewhere herein, the STIG configuration file 220 includes the STIG requirements and the actions that need to be performed to implement or harden the requirements. For example, the engine 500 may include code that parses and interprets the STIG configuration file 220 such as to determine the particular actions that need to be performed (e.g. modifications to the existing configuration) to harden the configuration for each enabled STIG requirement, or each enabled STIG category of requirements. Subsequently, the engine 500 may perform 512 such actions needed to harden the particular STIG requirements indicated as enabled (consistent with the STIG mode state information 240). The actions performed 512 modify the configuration of the SP and generate a modified configuration 514 that is a configuration hardened in accordance with the enabled STIG requirements as indicated by the STIG mode state information 240.

Figure 7:
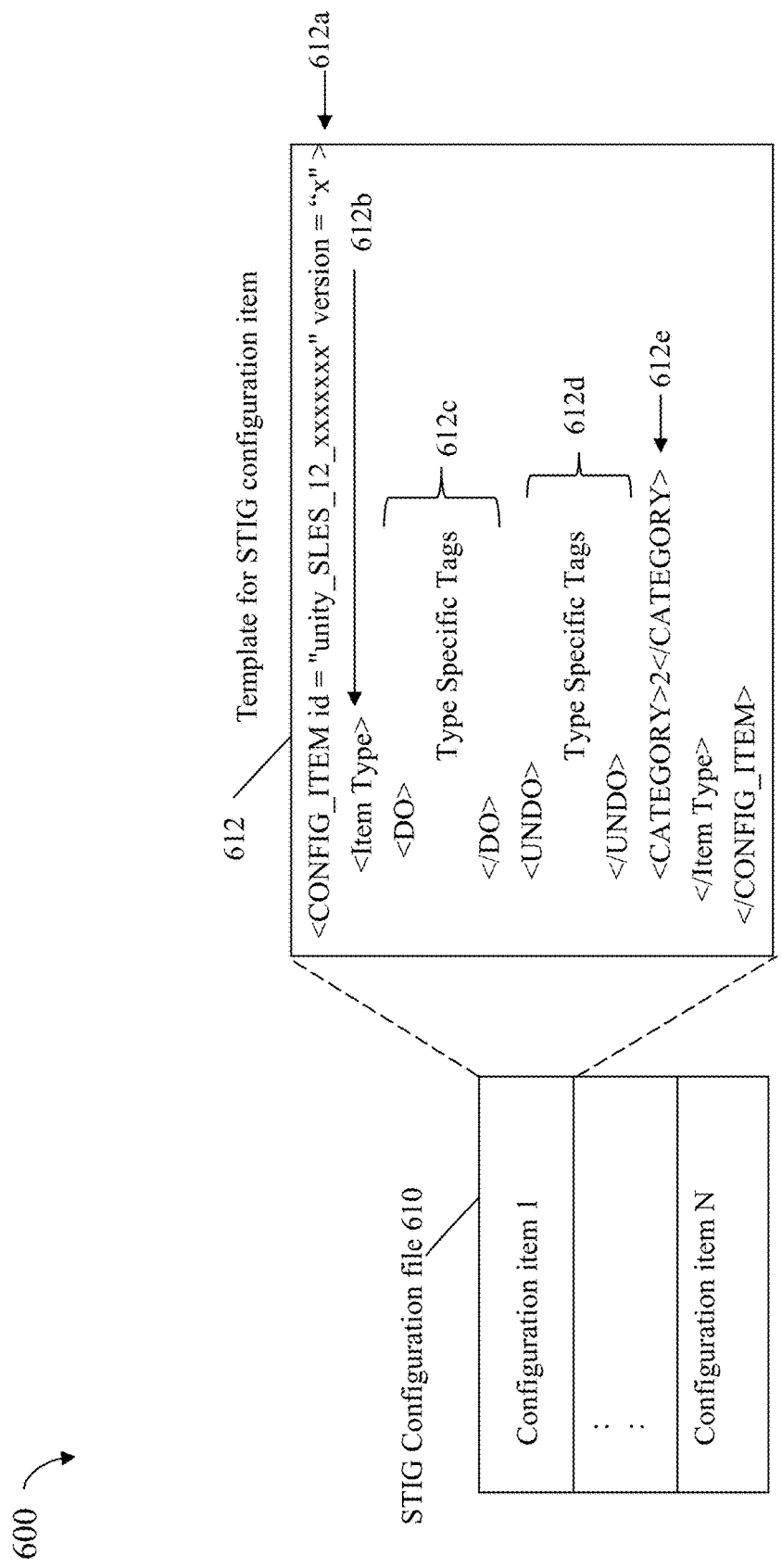
FIG. 7 is an example illustrating in more detail information that may be included in configuration file specifying requirements in an embodiment in accordance with techniques herein.

Referring to FIG. 7, shown is an example 700 illustrating a STIG configuration file that may be used in an embodiment in accordance with techniques herein. The STIG configuration file 610 may include a record or element for each STIG requirement applicable to a configuration. The file 610 is illustrated as include N configuration items, respectively for N STIG requirements. Element 612 provides further detail regarding what information may be specified for each configuration item or STIG requirement of the configuration file 610. Generally, element 612 illustrates a template for a single configuration item or STIG requirements. Line 612a specifies a unique identifier that may be used to uniquely distinguish and differentiate among all STIG requirements in the file 610. Line 612b specifies one of a set of predefined configuration item types. For example, in at least one embodiment, the predefined configuration item types may include: file metadata (e.g., file permissions, ownership, group ownership requirements); user operations (e.g., create, deletion and modification of user accounts for users of the system); group operations; file operations (e.g., create, delete); file content changes (e.g., add or remove lines from an existing command file on the system); service starts and stops (e.g., starting or stopping snapshot services for a LUN); and custom operations (e.g., other types of requirements different from any other foregoing type).

Element 612c may denote the actions, steps, or commands that need to be performed to harden or implement the specific requirement 612a. The actions of 612c may be performed when the requirement is enabled. Element 612d may denote the actions, steps, or commands that need to be performed to unharden the specific requirement 612a. The actions of 612d may be performed when the requirement is disabled. Element 612e denotes the STIG requirement category. In this example the STIG requirement 612a is a CAT 2 STIG requirement. Thus, this particular STIG requirement is hardened when CAT 2 STIG requirements are enabled (e.g., by enabling ALL STIG requirement categories or selectively enabling the single CAT2 STIG requirement category). Similarly, this particular STIG requirement is unhardened when CAT 2 STIG requirements are disabled (e.g., by disabling ALL STIG requirement categories or selectively disabling the single CAT2 STIG requirement category).

Referring to FIG. 8, shown is an example providing more detail of a STIG requirement. The example 750 includes a STIG ID 752, DISA STIG 754 (e.g., Identifying a particular set of DISA STIGs to which this particular STIG ID belongs), Severity 756 (e.g., STIG severity CAT), requirement 758 (e.g., description of the STIG requirement), check 760 (e.g., check performed to ensure or verify the requirement is met), and fix 762 (e.g., the action or command performed to implement or harden the requirement in a configuration of an SP). As indicated by the example 750, the STIG requirement has STIG ID (752) of SLES-12-001329, DISA STIG (754) of SLES12, is a CAT 2 severity (756), is a file metadata configuration item type that requires the audit.rules file be owned by root (758). As indicated by check 760, verification may include verifying the "/etc/audit/audit.rules" file is owned by root by running the following command:

sudo ls -o/etc/audit/audit.rules|cut -d " "-f3 root

As indicated by 762, the requirement may be hardened or implemented by appropriately configure the "/etc/audit/audit.rules" file to be owned by root with the following command:

sudo chown root/etc/audit/audit.rules

Figure 9:
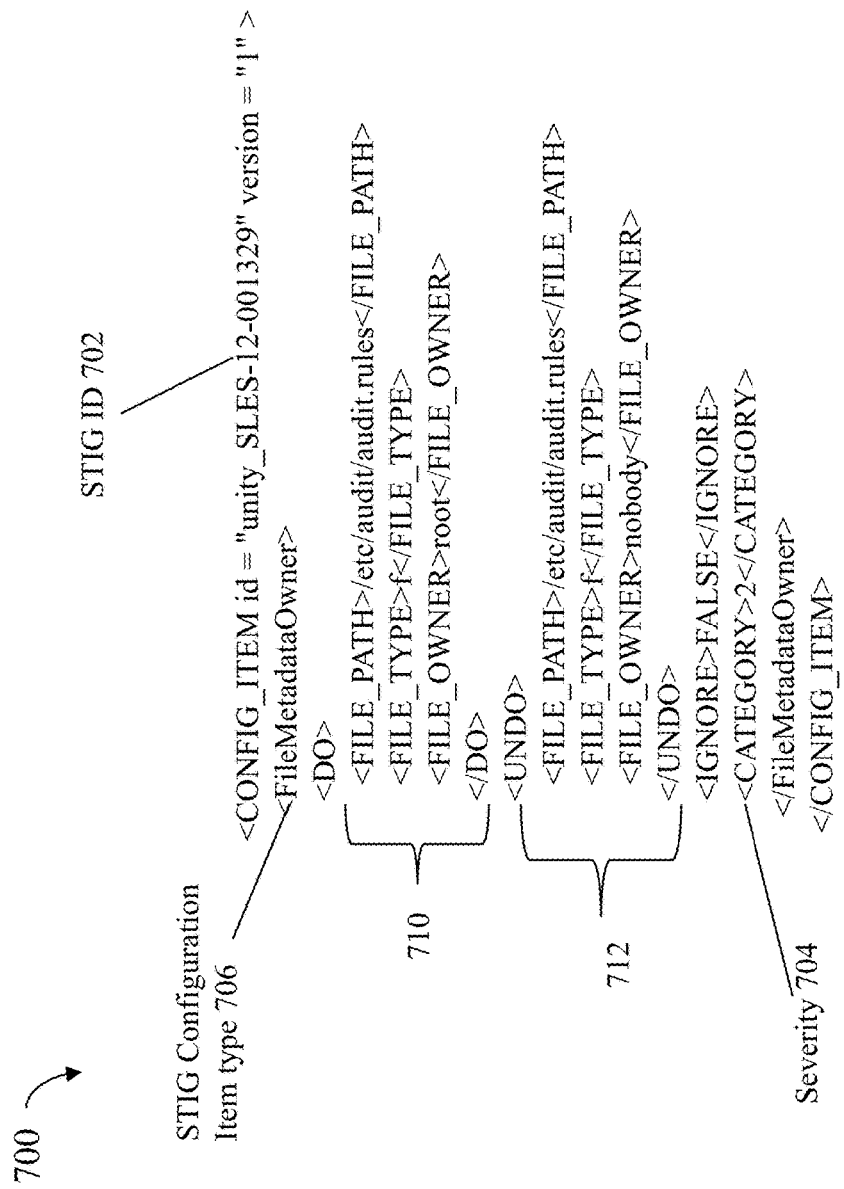

Referring to FIG. 9, shown is an example of the configuration item in accordance with the template 612 that may be included in the STIG configuration file for the STIG requirement of FIG. 8. In the example 700, the STIG ID 702 matches the STIG ID 752 of FIG. 8. The STIG configuration item type 706 is file metadata owner (consistent with 758, 760 and 762 of FIG. 8). The severity 704 matches the CAT 2 severity denoted by 756 of FIG. 8. Element 710 identifies the file path and owner to be set by commands responsive to enabling this STIG requirement, such as in connection with enabling all CAT 2 STIGs, in order to harden this STIG requirement. Issuing actions or commands to set the file identified in 710 FILE PATH to the specified FILE OWNER hardens this STIG requirement in a configuration. Element 712 identifies the file path and owner to be set by commands responsive to disabling this STIG requirement, such as in connection with disabling all CAT 2 STIGs, in order to harden this STIG requirement. Issuing actions or commands to set the file identified in 712 FILE PATH to the specified FILE OWNER unhardens this STIG requirement in a configuration.

Figure 10:
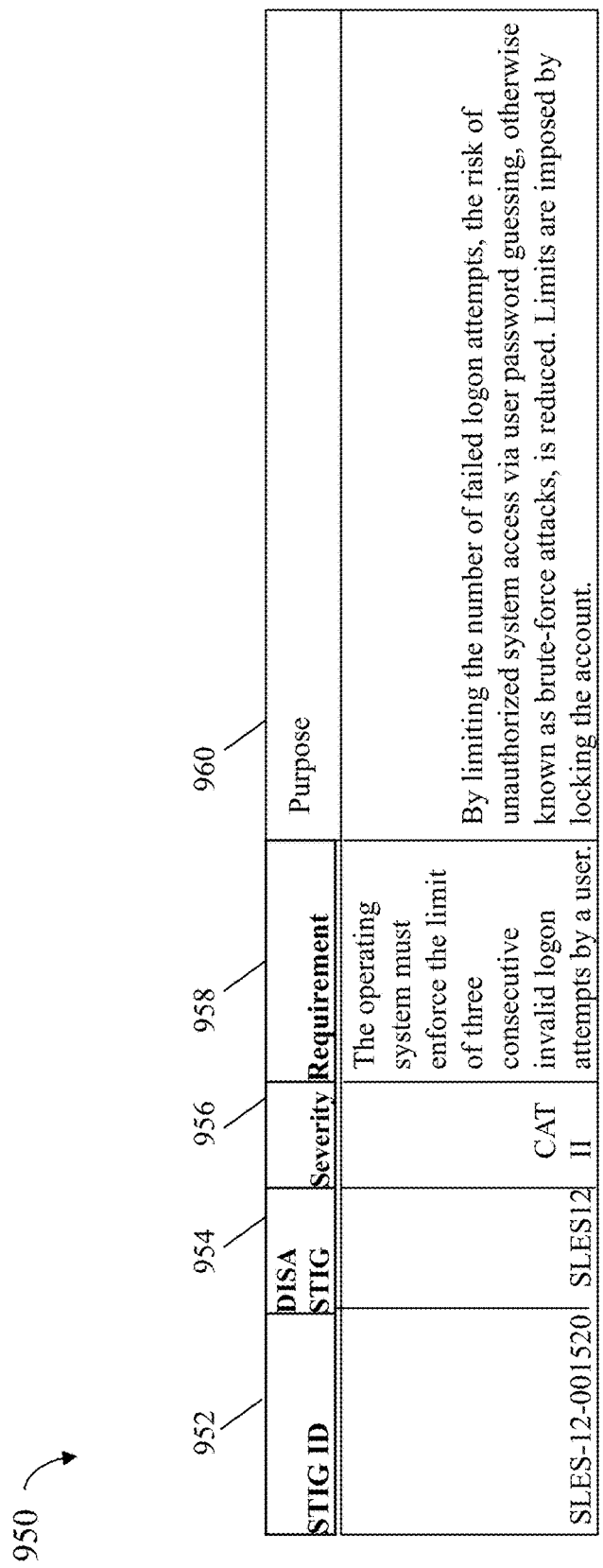
FIGS. 10 and 11 illustrate more detail regarding a second configuration requirement that may be used in an embodiment in accordance with techniques herein.

Referring to FIG. 10, shown is another example providing more detail of another STIG requirement. The example 950 includes a STIG ID 952, DISA STIG 954 (e.g., Identifying a particular set of DISA STIGs to which this particular STIG ID belongs), Severity 956 (e.g., STIG severity CAT), requirement 958 (e.g., description of the STIG requirement), and purposes 960. As indicated by the example 950, the STIG requirement has STIG ID (752) of SLES-12-001520, DISA STIG (754) of SLES12, and is a CAT 2 severity (756). Element 958 indicates that this requirement has the operating system enforce the limit of three consecutive logon attempts whereby after such 3 failed attempts, subsequent logons for the particular user may be locked, suspended for a specified time period, and the like. Element 960 indicates that the purpose or intent of this requirement by limiting the number of failed logon attempts, the risk of unauthorized system access via user password guessing, otherwise known as brute-force attacks, is reduced. Limits are imposed by locking the account.

In at least one embodiment, the operating system may be configured to enforce the limit of three consecutive invalid attempts of the requirement 950 using the source code file "pam_tally2.so" by modifying the content of the authorization file "/etc/pam.d/common-auth file". The foregoing authorization file may include an authorization section where the requirement may be enforced by adding a new command line to the authorization file. In particular, the following line:

auth required pam_tally2.so deny=3 even_deny_root root_unlock_time=120 may be added to the authorization file immediately before an existing line of the file that contains the "pam_unix.so" statement in the auth section.

Figure 11:
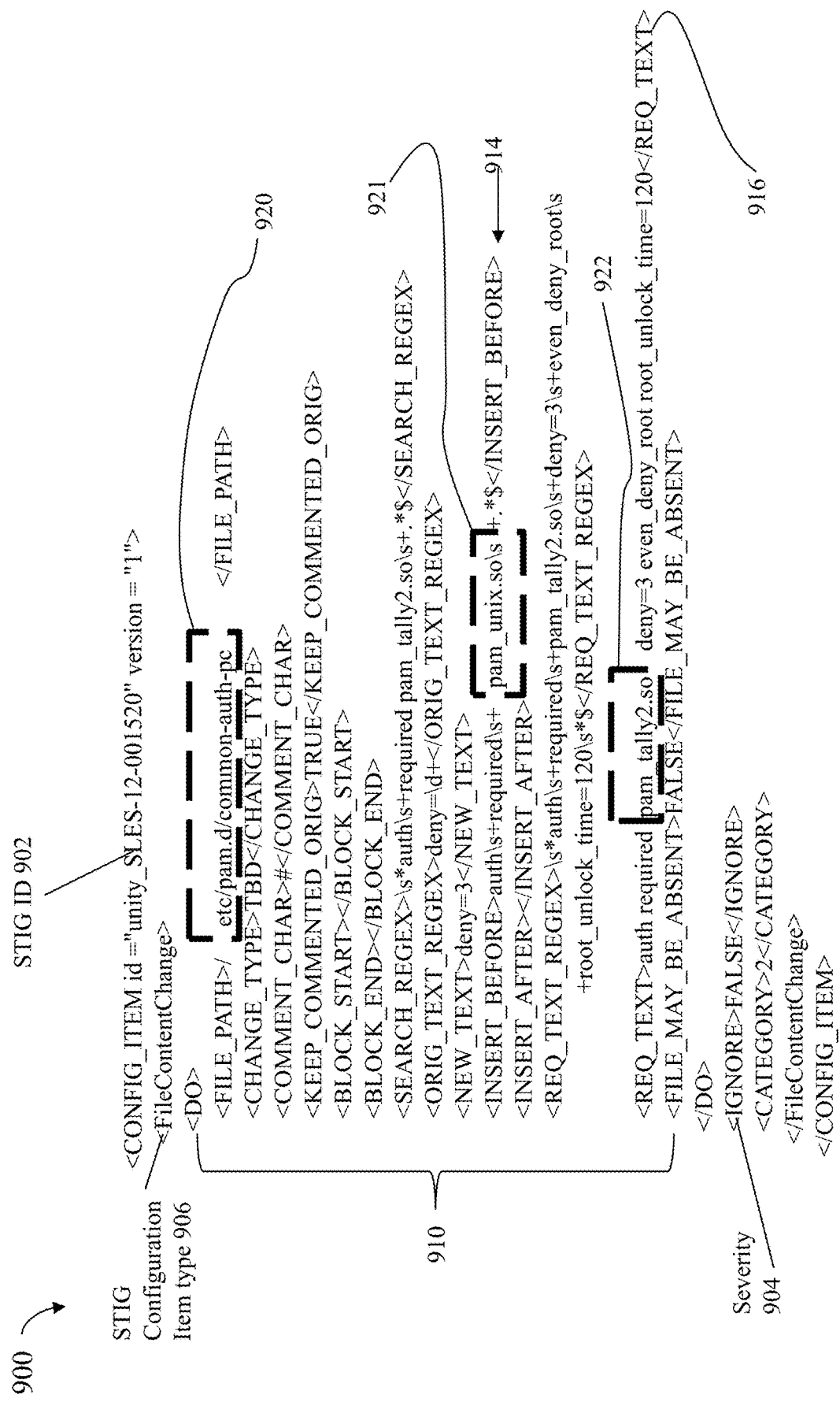

Referring to FIG. 11, shown is an example 900 of the configuration item information that may be included in the STIG configuration file for the STIG requirement as illustrated in FIG. 10. In the example 900, the STIG ID 902 matches the STIG ID 952 of FIG. 10. The STIG configuration item type 906 is file content change. The severity 904 matches the CAT 2 severity denoted by 956 of FIG. 10. Element 910 identifies the actions or commands performed that hardens this STIG requirement in a configuration when this requirement is enabled. Element 920 identifies the authorization file whose content is modified (e.g., the file "tc/pam.d/common-auth-pc". Element 914 identifies the marker line in the authorization file 920 serving as the marker location where the new command line 916 (including the source code file 922 "pam_tally2.so") is inserted prior to the marker line. (e.g., Enforce 3 logon limit using 922 pamm_tally2.so by modifying the content of authorization file 920 by adding line 916 before statement 914 of the authorization file, where statement 914 includes pam_unix.so 921).

It should be noted that particular details, such as a system including two SPs, particular ways in which STIG requirements may be enabled and disabled, and the like, should not be construed as limitations of techniques herein. As will be appreciated by those skilled in the art, techniques herein are readily and more generally applicable for use in any suitable embodiment, such as having any suitable number of SPs, specifying different ways for enabling and disabling STIG requirements than as described herein, applied for use in connection with configuration requirements other than STIG requirements, and the like.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of system hardening comprising:
receiving a command enabling configuration requirements in a system that includes a first processor and a second processor, wherein the first processor has a first configuration and is configured as an active processor that services received requests, and wherein the second processor has a second configuration and is configured as a passive processor that does not service received requests;
persistently storing state information regarding the configuration requirements enabled by the command;
modifying, in accordance with the state information, the second configuration of the second processor to apply and thereby harden the configuration requirements in the second configuration of the second processor;
rebooting the second processor that executes using the second configuration that has been hardened;
modifying, in accordance with the state information, the first configuration of the first processor to apply and thereby harden the configuration requirements in the first configuration of the first processor;
rebooting the first processor that executes using the first configuration that has been hardened; and
during said rebooting of the first processor, the first processor configured as the active processor becomes unavailable and triggers a switchover whereby the second processor is configured as the active processor that services received requests and the first processor is configured as the passive processor that does not service received requests, wherein the configuration requirements include a plurality of categories and the state information indicates whether any of the configuration requirements are enabled for the system, the state information indicates whether one or more selected categories of the plurality of categories of the configuration requirements are enabled for the system, the command enables the one or more selected categories of the configuration requirements, and the state information regarding the configuration requirements indicates that the one or more selected categories of the configuration requirements are enabled, and wherein the method further includes:
issuing a second command that disables the one or more selected categories of the configuration requirements; and
persistently storing an updated version of the state information regarding the configuration requirements to indicate that the one or more selected categories of the configuration requirements are disabled.

2. The method of claim 1, wherein, at any point in time, a single one of the first and the second processors is configured as the active processor that services management commands received over a control path, and wherein a remaining one of the first and the second processors is configured as the passive processor and does not service management commands received over the control path.

3. The method of claim 1, wherein prior to receiving the command, the system has all the configuration requirements disabled.

4. A method of system hardening comprising:
receiving a command enabling configuration requirements in a system that includes a first processor and a second processor, wherein the first processor has a first configuration and is configured as an active processor that services received requests, and wherein the second processor has a second configuration and is configured as a passive processor that does not service received requests;
persistently storing state information regarding the configuration requirements enabled by the command;
modifying, in accordance with the state information, the second configuration of the second processor to apply and thereby harden the configuration requirements in the second configuration of the second processor;
rebooting the second processor that executes using the second configuration that has been hardened;
modifying, in accordance with the state information, the first configuration of the first processor to apply and thereby harden the configuration requirements in the first configuration of the first processor;
rebooting the first processor that executes using the first configuration that has been hardened; and
during said rebooting of the first processor, the first processor configured as the active processor becomes unavailable and triggers a switchover whereby the second processor is configured as the active processor that services received requests and the first processor is configured as the passive processor that does not service received requests;

installing a new upgraded image on the first processor currently configured as the passive processor, wherein said installing configures the first processor to have a third configuration; and rebooting the first processor using the new upgraded image, wherein said rebooting includes:
reading the persistently stored state information regarding the configuration requirements; and
modifying, in accordance with the state information, the third configuration of the first processor to apply, and thereby harden, enabled ones of the configuration requirements in the third configuration of the first processor.

5. The method of claim 4, further comprising:
installing the new upgraded image on the second processor currently configured as the active processor, wherein said installing configures the second processor to have a fourth configuration; and
rebooting the second processor using the new upgraded image, wherein said rebooting includes:
reading the persistently stored state information regarding the configuration requirements; and
modifying, in accordance with the state information, the fourth configuration of the second processor to apply, and thereby harden, enabled ones of the configuration requirements in the fourth configuration of the second processor.

6. The method of claim 5, wherein during rebooting of the second processor configured as the active processor, the second processor becomes unavailable and triggers a switchover whereby the first processor is configured as the active processor that services received requests and the second processor is configured as the passive processor that does not service received requests.

7. The method of claim 4, wherein the new upgraded image includes a first configuration requirement that is any of: a new configuration requirement not included in either the first configuration or the second configuration, and a revised configuration requirement that is a modified version of an existing requirement included in both the first configuration and the second configuration.

8. The method of claim 7, wherein after said rebooting the first processor, said first configuration requirement is hardened in the third configuration, and wherein after said rebooting the second processor, said first configuration requirement is hardened in the fourth configuration.

9. A system comprising:
a first processor and a second processor; and
a memory comprising code stored thereon, that when executed, performs a method of system hardening comprising:
receiving a command enabling configuration requirements in the system, wherein the first processor has a first configuration and is configured as an active processor that services received requests, and wherein the second processor has a second configuration and is configured as a passive processor that does not service received requests;
persistently storing state information regarding the configuration requirements enabled by the command;
modifying, in accordance with the state information, the second configuration of the second processor to apply and thereby harden the configuration requirements in the second configuration of the second processor;
rebooting the second processor that executes using the second configuration that has been hardened;
modifying, in accordance with the state information, the first configuration of the first processor to apply and thereby harden the configuration requirements in the first configuration of the first processor;
rebooting the first processor that executes using the first configuration that has been hardened; and
during said rebooting of the first processor, the first processor configured as the active processor becomes unavailable and triggers a switchover whereby the second processor is configured as the active processor that services received requests and the first processor is configured as the passive processor that does not service received requests, wherein the configuration requirements include a plurality of categories and the state information indicates whether any of the configuration requirements are enabled for the system, the state information indicates whether one or more selected categories of the plurality of categories of the configuration requirements are enabled for the system, the command enables the one or more selected categories of the configuration requirements and the state information regarding the configuration requirements indicates that the one or more selected categories of the configuration requirements are enabled, and wherein the method further includes:
issuing a second command that disables the one or more selected categories of the configuration requirements; and
persistently storing an updated version of the state information regarding the configuration requirements to indicate that the one or more selected categories of the configuration requirements are disabled.

10. A non-transitory computer readable medium comprising code stored thereon that, when executed, performs a method of system hardening comprising:
receiving a command enabling configuration requirements in a system that includes a first processor and a second processor, wherein the first processor has a first configuration and is configured as an active processor that services received requests, and wherein the second processor has a second configuration and is configured as a passive processor that does not service received requests;
persistently storing state information regarding the configuration requirements enabled by the command;
modifying, in accordance with the state information, the second configuration of the second processor to apply and thereby harden the configuration requirements in the second configuration of the second processor;
rebooting the second processor that executes using the second configuration that has been hardened;
modifying, in accordance with the state information, the first configuration of the first processor to apply and thereby harden the configuration requirements in the first configuration of the first processor;
rebooting the first processor that executes using the first configuration that has been hardened; and
during said rebooting of the first processor, the first processor configured as the active processor becomes unavailable and triggers a switchover whereby the second processor is configured as the active processor that services received requests and the first processor is configured as the passive processor that does not service received requests, wherein the configuration requirements include a plurality of categories and the state information indicates whether any of the configuration requirements are enabled for the system, the state information indicates whether one or more selected categories of the plurality of categories of the configuration requirements are enabled for the system, the command enables the one or more selected categories of the configuration requirements, and the state information regarding the configuration requirements indicates that the one or more selected categories of the configuration requirements are enabled, and wherein the method further includes:
   issuing a second command that disables the one or more selected categories of the configuration requirements; and
   persistently storing an updated version of the state information regarding the configuration requirements to indicate that the one or more selected categories of the configuration requirements are disabled.

11. The non-transitory computer readable medium of claim 10, wherein, at any point in time, a single one of the first and the second processors is configured as the active processor that services management commands received over a control path, and wherein a remaining one of the first and the second processors is configured as the passive processor and does not service management commands received over the control path.

12. The non-transitory computer readable medium of claim 10, wherein prior to receiving the command, the system has all the configuration requirements disabled.

13. A non-transitory computer readable medium comprising code stored thereon that, when executed, performs a method of system hardening comprising:
   receiving a command enabling configuration requirements in a system that includes a first processor and a second processor, wherein the first processor has a first configuration and is configured as an active processor that services received requests, and wherein the second processor has a second configuration and is configured as a passive processor that does not service received requests;
   persistently storing state information regarding the configuration requirements enabled by the command;
   modifying, in accordance with the state information, the second configuration of the second processor to apply and thereby harden the configuration requirements in the second configuration of the second processor;
   rebooting the second processor that executes using the second configuration that has been hardened;
   modifying, in accordance with the state information, the first configuration of the first processor to apply and thereby harden the configuration requirements in the first configuration of the first processor;
   rebooting the first processor that executes using the first configuration that has been hardened; and
   during said rebooting of the first processor, the first processor configured as the active processor becomes unavailable and triggers a switchover whereby the second processor is configured as the active processor that services received requests and the first processor is configured as the passive processor that does not service received requests;
   installing a new upgraded image on the first processor currently configured as the passive processor, wherein said installing configures the first processor to have a third configuration; and
   rebooting the first processor using the new upgraded image, wherein said rebooting includes:
      reading the persistently stored state information regarding the configuration requirements; and
      modifying, in accordance with the state information, the third configuration of the first processor to apply, and thereby harden, enabled ones of the configuration requirements in the third configuration of the first processor.

14. A system comprising:
a first processor and a second processor; and
one or more memories comprising code stored thereon that, when executed, perform a method of system hardening comprising:
   receiving a command enabling configuration requirements in a system that includes a first processor and a second processor, wherein the first processor has a first configuration and is configured as an active processor that services received requests, and wherein the second processor has a second configuration and is configured as a passive processor that does not service received requests;
   persistently storing state information regarding the configuration requirements enabled by the command;
   modifying, in accordance with the state information, the second configuration of the second processor to apply and thereby harden the configuration requirements in the second configuration of the second processor;
   rebooting the second processor that executes using the second configuration that has been hardened;
   modifying, in accordance with the state information, the first configuration of the first processor to apply and thereby harden the configuration requirements in the first configuration of the first processor;
   rebooting the first processor that executes using the first configuration that has been hardened; and
   during said rebooting of the first processor, the first processor configured as the active processor becomes unavailable and triggers a switchover whereby the second processor is configured as the active processor that services received requests and the first processor is configured as the passive processor that does not service received requests;
   installing a new upgraded image on the first processor currently configured as the passive processor, wherein said installing configures the first processor to have a third configuration; and
   rebooting the first processor using the new upgraded image, wherein said rebooting includes:
      reading the persistently stored state information regarding the configuration requirements; and
      modifying, in accordance with the state information, the third configuration of the first processor to apply, and thereby harden, enabled ones of the configuration requirements in the third configuration of the first processor.

* * * * *